United States Patent

[11] 3,563,603

| [72] | Inventors | Joseph F. D'Aprile<br>Detroit;<br>Alfons Olada, Dearborn Heights, Mich. |
|---|---|---|
| [21] | Appl. No. | 855,162 |
| [22] | Filed | Sept. 4, 1969 |
| [45] | Patented | Feb. 16, 1971 |
| [73] | Assignee | Ford Motor Company<br>Dearborn, Mich. |

[54] HEADREST ASSEMBLY
14 Claims, 5 Drawing Figs.

[52] U.S. Cl. .................................................. 297/410, 297/397
[51] Int. Cl. ........................................ A47c 7/36, A47c 7/42
[50] Field of Search .......................................... 297/397, 399, 410; 248/476, 407, 409

[56] References Cited
UNITED STATES PATENTS

| 3,027,194 | 3/1962 | Rumptz | 297/410 |
| 3,063,751 | 11/1962 | Hatch | 297/410 |
| 3,498,672 | 3/1970 | Leichtl | 297/410 |

*Primary Examiner*—Casmir A. Nunberg
*Attorneys*—John R. Faulkner and John J. Roethel ABSTRACT: A headrest assembly for a cushioned seat back comprising a fixed bracket mounted within the seat back, a sleeve having an escutcheon at the upper end thereof, and a cushioned headrest member attached at one end to a support post. The sleeve is telescopically received within the bracket to a depth determined by engagement of the escutcheon with the upper surface of the cushioned seat back and the support post is telescopically and vertically adjustably received within the bracket and sleeve subassembly. Insertion of the support post into the sleeve causes the latter to be locked to the bracket.

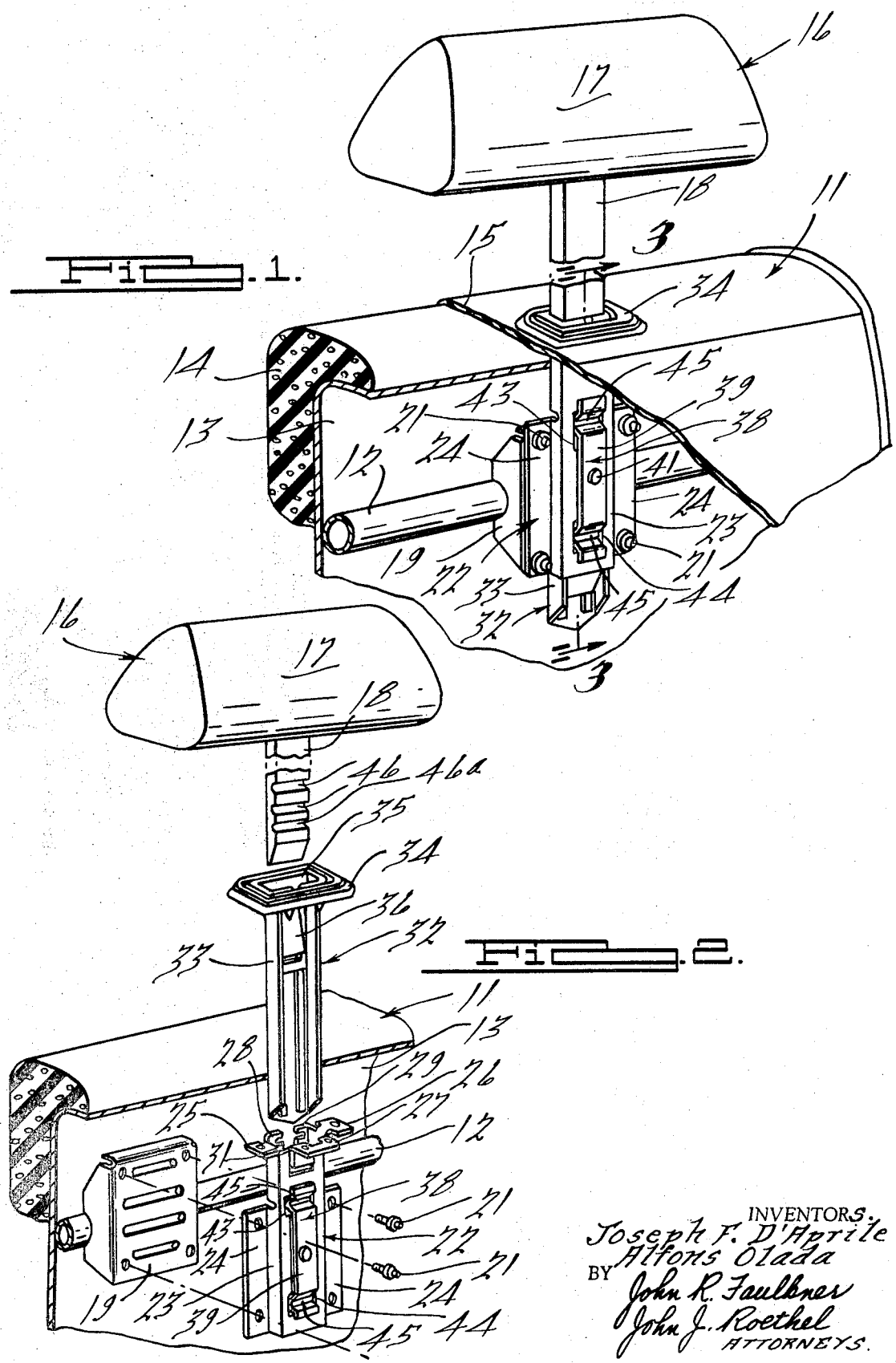

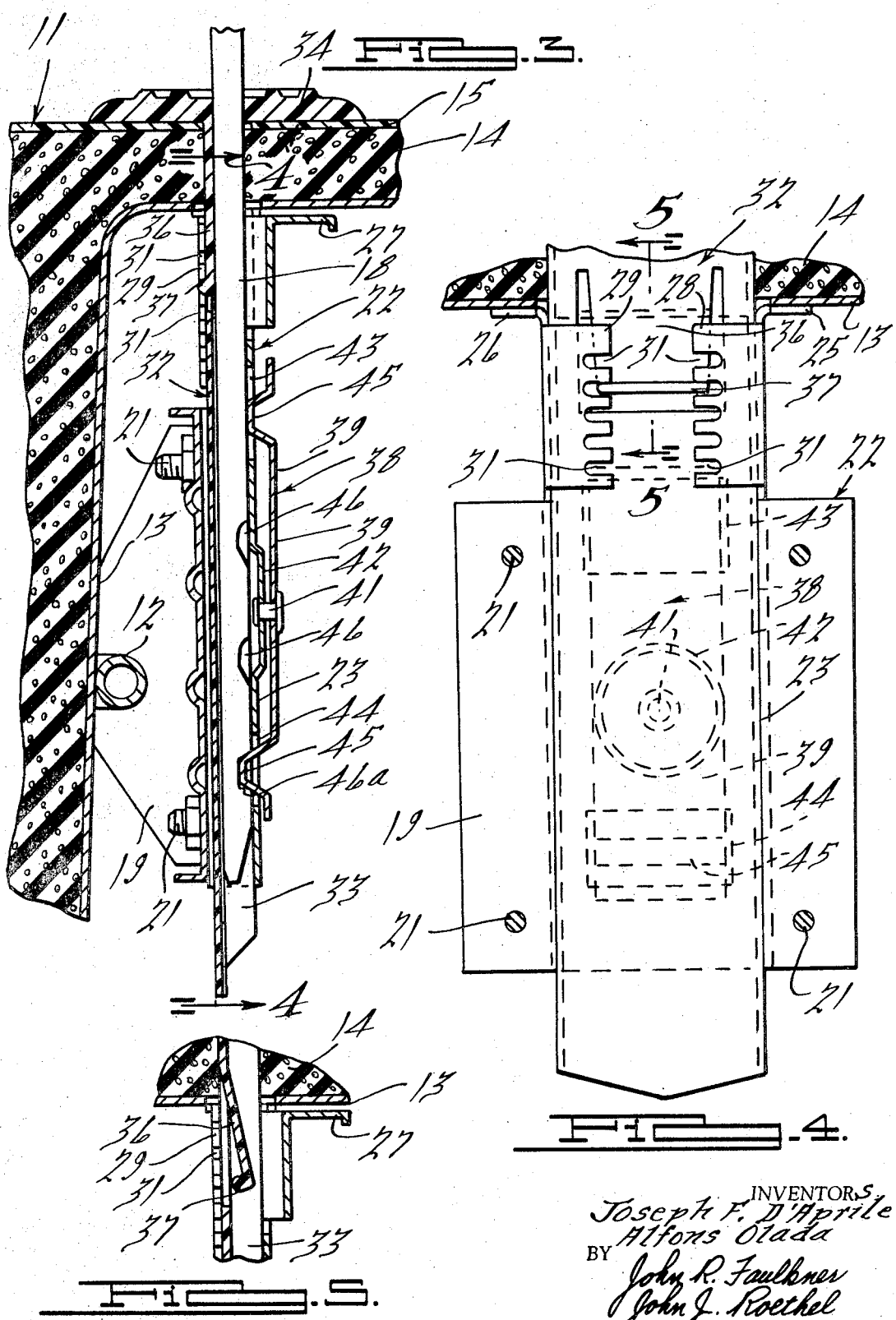

HEADREST ASSEMBLY

BACKGROUND OF THE INVENTION

One conventional assembly of a headrest to a cushioned seat back involves securing a vertical sleeve to a seat frame structure with the open upper end of the sleeve projecting through the upper seat cushion material in position to receive the support post of the headrest cushion member. The upper end of the sleeve is usually capped by an escutcheon or plate that rests on the upper outer cushion surface. The escutcheon or plate provides lateral stability to the upper end of the sleeve and also has an ornamental effect in that it covers any ragged edges of the material around the edges of the aperture through which the headrest post projects. Such an arrangement is disclosed in U.S. Pat. No. 3,027,194.

As disclosed in this patent, the dimension from the escutcheon bottom surface to the point of support on the seat frame of the casing or sleeve receiving the headrest support post is relatively fixed. Many times the basic seat structure used by a vehicle manufacturer across its car lines is the same, the difference in the seats used in the several models being in the thickness of the cushion material. The more luxurious the vehicle interior the more likely the seat frame structure will be covered with heavier foam rubber and thicker exterior covering material or fabrics. Even in the seat on like vehicles there is dimensional variance in the thickness of the cushion material across the top of the seat. Accordingly, it is somewhat difficult to have a good relationship of the escutcheon plate on the upper surface of the seat back cushion. The pressure of the escutcheon plate may either create an unsightly depression or there may be a gap between the upper surface of the cushion material and the underside of the escutcheon plate.

It is an object of the present invention to simplify the final assembly of the headrest unit to the seat back to provide automatically for variations in cushion thicknesses to accommodate different models of the same basic seat or to accommodate variations in cushion thicknesses of the same model of the basic seat.

SUMMARY OF THE INVENTION

The headrest assembly for a cushion seat back as embodied in the present invention comprises a cushion headrest member attached to one end of a support post. A fixed bracket means is mounted within the seat back. An elongated sleeve means having an escutcheon at the upper end thereof is telescopically adjustably received within a guide means on the bracket means. The assembly of the sleeve means is accomplished by inserting the latter through an aperture in the seat back cushion material into the guide means on the bracket means. The sleeve means is forced down the guide means until the escutcheon on its upper end rests on an upper surface of the cushion seat back. Sufficient pressure is applied so that the escutcheon is seated firmly on the upper surface of the cushion seat back without causing an undue depression. An interlocking means on the guide means and the sleeve means holds the latter and the escutcheon immovable relative to the upper surface of the cushion seat back after insertion at the headrest support post into the guide means and sleeve means subassembly.

DESCRIPTION OF THE DRAWINGS

Other objects, advantages and features of the present invention can be made more apparent as this description proceeds, reference being had to the accompanying drawings wherein:

FIG. 1 is a perspective view in part sectional of the headrest assembly embodying the present invention;

FIG. 2 is an exploded perspective view in part sectional of the separate components of the headrest assembly;

FIG. 3 is a sectional view on the line 3–3 of FIG. 1;

FIG. 4 is a sectional view taken on the line 4–4 of FIG. 3; and

FIG. 5 is a sectional view on the line 5–5 of FIG. 4.

DETAILED DESCRIPTION OF THE INVENTION

Referring now to the drawings and more particularly to FIG. 1, there is illustrated a fragmentary portion of a vehicle seat back rest 11. Visible is an upper cross member 12 of the seat frame structure and a portion of the back rest shell or base member 13 supporting the cushioning material 14. The cushioning material 14 may be foam rubber or any cushioning material available having similar qualities The cushioning material 14 is covered by a vinyl or fabric layer 15.

Federal safety standards require that the back rest of the front seat of passenger motor vehicles carry a head rest or a head restraint device to limit the free rearward movement of a vehicle occupant's head under conditions that would produce a whip lash effect. This head rest or head restraint device, generally designated 16, comprises a cushioned headrest member 17 of generally triangular pillow shape and somewhat elongated in the horizontal axis. The cushioned member 17 is attached to and supported on the upper end of a centrally positioned support post 18. The present invention is not concerned with the internal structure of the headrest member 17 and the manner of attachment to the support post.

Concealed within the seat back rest is the headrest mounting structure. This comprises a flanged base plate 19 welded or otherwise fixed to a seat back cross member 12. Held to the base plate 19 by bolts 21 is a bracket means 22 which in general is a channel-shaped member 23 having mounting flanges 24 at each side of the channel portion. At its upper end the channel member 23 has a plurality of right angle flanges or tabs 25, 26 and 27 which are adapted to lie beneath the underside of the seat back shell as best seen in FIGS. 3 and 4.

Also at its upper end and beneath the tabs 25 and 26, the channel member 23 has two inwardly turned opposed flanges 28 and 29. These flanges are parallel to the base of the channel member, and as best seen in FIGS. 2 and 4, terminate with a substantial gap therebetween. The flanges 28 and 29 have a plurality of spaced aligned slots 31 extending in the longitudinal direction of the channel member 23, for a purpose to be explained.

The channel member 23 upper end with its opposed flanges 28 and 29 forms a substantially rectangularly guide means that telescopically receives a sleeve means, generally designated 32. The sleeve means 32 is preferably a molded plastic member having an elongated channel section 33 topped by an apertured plate 34 more properly termed an escutcheon since it has a protective or ornamental function, as will become apparent. The exterior dimensions of the channel sections 33 are complementary to the interior dimensions of the rectangular guide means at the upper end of the bracket means 22 so that the sleeve means will have a snug slip fit into the guide means.

The aperture 35 is in the escutcheon is dimensioned to receive the headrest support post 18 with a slip fit. The channel member 23 of the bracket means 22 and the channel section 33 of the sleeve means 32 coact to telescopically receive the support post 18 after insertion of the latter through the escutcheon aperture 35.

The subassembly of the bracket means 22 and the sleeve means 33 is an important feature of the present invention that provides an important production advantage. On many car lines produced by the same manufacturer, substantially similar seat back frames are used. On the base frame, variations in style, shape and cushion thicknesses distinguish one seat model from another. For example, the foam rubber 12 on the shell or base member 13 may be a fibrous cushioning material on a burlap support material over the seat spring. There can be substantial variation in the thickness of the upper seat back cushioning material through which the headrest support post 18 projects because of the type of material used. Even on seats of the same design, there can be variations in the final dimension between the upper surface of the bracket means tabs 26, 27 and 28 and the upper surface of the seat back rest fabric layer 15.

With the construction and arrangement embodied in the present invention, the upholstered seat back rest 13 arrives at the headrest assembly point with the bracket means 22 in place and concealed within the backrest. The upper surface of the backrest is pierced to provide an aperture in alignment with the guide means portion of the bracket means, i.e., the upper end of the channel 23 and the inturned flanges 28 and 29. All that the headrest assembler is required to do is to shove the sleeve means a32 through the aperture in the seat backrest outer layer 15 and through the guide means until the escutcheon comes to rest on the backrest upper surface.

An interlocking means is provided for locking the sleeve means 32 and the bracket means 22. Part of this interlocking means comprises the slots 31 in the opposed flanges 28—29 of the bracket means channel member 23. As shown in enlarged detail in FIG. 5, the sleeve means channel section 33 has an angularly inclined digital portion 36 terminating in a laterally extending rounded rib 37. Since the sleeve means is preferably plastic, it is an easy matter to form the digital portion 36 out of the base of the channel section 33. The digital portion is integrally hinged at 38 to the base of the channel section 33. As seen in FIG. 5, it will be noted that the digital portion projects into the channel section so as not to interfere with the insertion or removal of the sleeve means during the assembly operation.

The assembler is required to press the sleeve means 32 down into the bracket means 22 until the escutcheon 34 rests firmly on the upper surface of the seat backrest cushion material, but not to the extend extent that a depression in the upper surface is created. Depending upon the material, the rib 37 on the digital portion 36 of the sleeve means 32 will be in substantially alignment with one or more of the slots 31 and the flanges 28—29 of the channel member 23.

In order to lock the sleeve means 32 to the bracket means 22, it is only necessary for the assembler to insert the headrest support post 18 into the aperture 35 of the sleeve means 32. As the headrest support post 18 is shoved down into the pocket formed by the opposed channel sections of the sleeve means 32 and the bracket means 22, the digital portion 36 of the sleeve means channel section 33 will be flexed outwardly forcing the rib 36 into engagement with one of the slots 31, as shown in FIGS. 3 and 4. Sleeve means 32 will then be locked to the bracket means 22.

In a typical production headrest assembly, the longitudinal slots 31 adapted to coact with the rib 37 on the digital portion 36 of the sleeve means 32 extend for at least an inch in a vertical direction thus providing for the accommodation of an equivalent range of thicknesses of seat backrest cushion materials.

The fixed bracket means 22 includes a detent means, generally designated 38, engaged with the headrest support post 18 to hold the headrest in any one of a plurality of selected raised or lowered positions relative to the upper surface of the cushion seat back. The detent means 38 comprises an elongated rectangular leaf spring 39 riveted at 41 intermediate its ends to a boss 42 on the exterior of the bracket means channel member 23. The base of the channel member 23 is apertured at 43—44. Indented or formed portions 45 at each of the ends of the leaf spring 39 project through the apertures 43—44, respectively, for engagement with the opposed surface of the headrest support arm 18. At its lower end, the headrest support arm has a plurality of spaced notches 46 adapted to be engaged by the formed portion 45 at the lower spring end projecting through the channel member 23 base aperture 44.

The notches 46 are contoured to resist downward movement of the headrest to a greater extent than they resist upward movement therefor to compensate for the weight of the headrest. This, of course, will assist in the downward movement of the latter. The lowermost notch 46a, however, is contoured not only to resist downward movement of the headrest support post when the spring portion 45 is seated therein, but provides even greater resistance to upward movement. The reason for this is to prevent unintentional removal of the headrest from the backrest. In other words, the momentum resulting from a lifting force being applied to the headrest to raise it to a higher position on the backrest ordinarily will be insufficient to overcome the resistance of the lead leaf spring 39 to deflection of its lower formed portion 45 when the spring engages the notch 46a on the headrest support post 18. In the event that it is desired deliberately to remove the headrest, this can be done by using the leverage of an implement such as a piece of two by four lumber.

It will be understood that this invention is not to be limited to the exact construction shown and described but that various changes and modifications may be made without departing from the spirit and scope of the invention.

We claim:

1. A headrest assembly for a cushioned seat back, comprising:
   a cushioned headrest member attached to one end of a support post;
   a fixed bracket means mounted within said seat back;
   an elongated sleeve means having an escutcheon at the upper end thereof;
   guide means on the bracket means in which the sleeve means is telescopically adjustably received to the extent that the escutcheon rests upon o an upper surface of the cushioned seat back;
   the guide means and sleeve means coacting to telescopically support the headrest support post therein; and
   interlocking means on the guide means and sleeve means for holding the latter and the escutcheon thereon immovable relative to the upper surface of the cushioned seat back after insertion of the headrest support post therein.

2. A headrest assembly according to claim 1, in which:
   the interlocking means comprises a latch member carried on the sleeve means engageable with a keeper device on the guide means;
   the keeper device having a plurality of latch member receiving slots extending longitudinally of the direction of insertion of the sleeve means in the guide means; and
   the latch member being urged into which ever one of said slots is substantially in alignment therewith by the headrest support post upon telescopic insertion of the latter into the guide means and sleeve means.

3. A headrest assembly according to claim 2, in which the range of adjustment of the sleeve means within the guide means accommodates dimensional variations from the fixed bracket to the upper surface of the cushioned seat back resulting from design variations in cushion thicknesses on different model seats.

4. A headrest assembly according to claim 2, in which: the fixed bracket means includes a detent means engaged with the support posts to hold the headrest member in any one of a plurality of selected raised or lowered positions relative to the upper surface of the cushioned seat back.

5. A headrest assembly according to claim 4, in which:
   the detent means comprises a resilient latch device;
   and the support posts have a plurality of latch device engaging notches at the lower end thereof; and
   the resilient latch device being selectively engaged with any one of said notches to yieldably hold the headrest member in any one of a plurality of selected raised or lowered positions relative to the upper surface of the cushioned seat back.

6. A headrest assembly according to claim 5, in which: the lowermost of the plurality of support post notches and the resilient latch device coact to resist withdrawal of the support post from the guide means and sleeve means.

7. A headrest assembly according to claim 1, in which: the fixed bracket means includes detent means engaged with the support post to hold the headrest member in any one of a plurality of selected raised or lowered positions relative to the upper surface of the cushioned seat back.

8. A headrest assembly according to claim 7, in which:

the detent means comprises a resilient latch device;

the support post has a plurality of latch device engaging notches at the lowered end thereof; and the resilient latch device is selectively engaged with any one of said notches to yieldably hold the headrest member in any one of a plurality of selected raised or lowered positions relative to the upper surface of the cushioned seat back.

9. A headrest assembly according to claim 8, in which: the lowermost of the plurality of support post notches and the resilient latch device coact to resist withdrawal of the support post from the guide means and sleeve means.

10. A headrest assembly for a cushioned seat back, comprising:

a cushioned headrest member attached to one end of a support post;

a fixed bracket mounted within said seat back having a longitudinally extending channel therein;

an elongated sleeve comprising a channel member having an escutcheon at the upper end thereof;

the sleeve channel member being telescopically adjustably received within the bracket channel;

the engagement of the escutcheon with the upper surface of the seat back cushion controlling the depth of penetration of the sleeve channel member into the bracket channel;

the sleeve channel member and the bracket having interlocking latch means comprising a deflectable latch portion on the sleeve channel member and keeper elements on the bracket extending longitudinally of the direction of insertion of the sleeve in the bracket;

the sleeve channel member and the bracket channel coacting to telescopically support the headrest support post therein; and the sleeve channel member being locket locked to the bracket by deflection of the latch portion into engagement with one of said keeper elements by the support post upon telescopic insertion of the latter into the sleeve channel member and bracket channel.

11. A A headrest assembly according to claim 10, in which: the range of adjustment of the sleeve channel member within the bracket channel accommodates dimensional variations from the fixed bracket to the upper surface of the cushioned seat back resulting from design variations in cushion thicknesses on different model seats.

12. A headrest assembly according to claim 11, in which: the fixed bracket supports detent means engageable with the support post to hold the headrest member in any one of a plurality of selected raised or lowered positions relative to the upper surface of the cushioned seat back.

13. A headrest assembly according to claim 10, in which: the detent means comprises a resilient latch device engageable with any one of a plurality of notches on the support post to hold the headrest member in any one of a plurality of selected raised or lowered positions relative to the upper surface of the cushioned seat back.

14. A headrest assembly according to claim 13, in which: the lowermost of the plurality of support posts notches and the resilient latch device coact to resist withdrawal of the support posts from the bracket and the sleeve.